No. 12,719. REISSUED NOV. 12, 1907.

P. T. COFFIELD.

WATER MOTOR.

APPLICATION FILED JULY 28, 1906.

Peter T. Coffield
Inventor

Witnesses
Matthew Sibler.
C. M. Theobald.

By R. J. McCarty
his Attorney

UNITED STATES PATENT OFFICE.

PETER T. COFFIELD, OF DAYTON, OHIO, ASSIGNOR TO P. T. COFFIELD & SON, OF DAYTON, OHIO, A FIRM.

WATER-MOTOR.

No. 12,719. Specification of Reissued Letters Patent. Reissued Nov. 12, 1907.

Original No. 806,779, dated December 12, 1905, Serial No. 183,119. Application for reissue filed July 28, 1906. Serial No. 328,272.

*To all whom it may concern:*

Be it known that I, PETER T. COFFIELD, a citizen of the United States, residing at Dayton, county of Montgomery, and State of Ohio, have invented certain new and useful Improvements in Water-Motors; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in water motors.

The object of the invention is to provide a water motor for driving light machinery such, for example, as washing machines or other machines having a reversed motion.

A further object of the invention is to provide a water motor of the above type which is positive and reliable in its operations, and in which, means are provided for preventing stoppage of the motor at any point of its stroke while under power; a motor which will continue in its operation without attention.

Preceding a detail description of the invention, reference is made to the accompanying drawings, of which—

Figure 1:
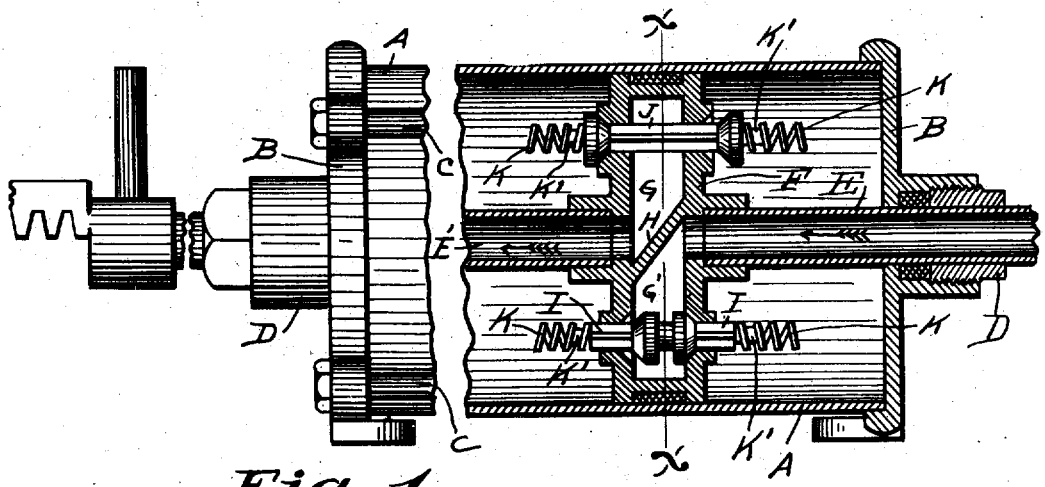
Figure 2:
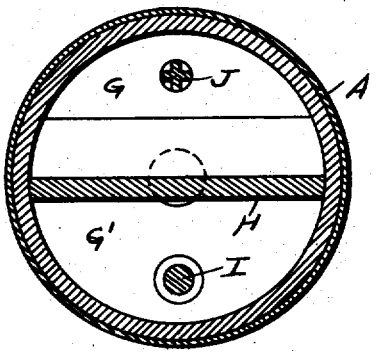

Figure 1, is a horizontal elevation of my improved motor partly in section and a portion of the cylinder broken away. Fig. 2, is a sectional view on the line $x$—$x$ of Fig. 1.

In a detail description of the invention, similar reference characters indicate corresponding parts.

A designates the motor cylinder, the ends of which are inclosed by heads B, which are rigidly secured on the ends of the cylinder by a suitable number of bolts C.

F designates a piston which is divided into two noncommunicating chambers G—G′ by a partition wall H, chamber G′ constituting the inlet chamber to opposite sides of the piston, and chamber G constituting the exhaust chamber for opposite sides of said piston.

E and E′ are hollow piston rods connected with opposite sides of the piston, the former being the water inlet pipe to chamber G′ and the latter being the outlet pipe from the exhaust chamber G, as indicated by the arrows. These piston rods pass through suitable stuffing boxes D in the heads of the cylinder, and from one of said piston rods the power is conveyed to the machine to be driven.

I designates an inlet valve which seats in the inner sides of the piston, and the stems K′ of which project through the walls of the piston and carry spiral springs K. The ends of these springs lie beyond the ends of the valve stems. J designates an exhaust valve which seats against the outer sides of the piston; this valve J also has its stem K′ projected through the walls of the piston and fitted with similar spiral springs K, the ends of which lie beyond the extreme ends of the stem. The valves are alternately thrown off their seats or given initial movement by the stems making contact with the cylinder heads, the ends of the springs being first compressed by coming in contact with said cylinder heads. As soon as said valves are moved from their seats by the contact of the stems with the cylinder heads, the said valves become balanced and in inoperative positions owing to the pressure on both sides thereof being substantially equal, and it becomes necessary to complete the movement of said valves; this is accomplished by the springs. The said springs having become compressed before the ends of the valve stems make contact with the cylinder heads, the said valves are moved across by said springs to opposite seats as soon as they become balanced, and the motor is thus reversed; in other words, the springs impart the final movement of the valves after they have been unseated and placed in a balanced position. The valve springs are thus under the control of the moving piston for a brief period only, after which said springs act to perform their functions, which is to enable the piston to reverse its movement; for example, while the springs are being compressed against the cylinder heads, and until the valves are unseated, the springs are controlled by the moving piston; the instant the valves are unseated, the reverse or return movement of the piston is entirely dependent upon the action of the springs, the functions of which are, as before stated, to throw the valves from balanced positions to completed movements. The source of power, to-wit—water, enters the piston rod E and passes into the inlet chamber G′ and thence through one or the other of the ports of the inlet valve I. As the piston appears in Fig. 1, it is moving to the right, and the valve I is unseated on one side of the piston to permit the water from the chamber G′ to enter on the left side of the piston, and to thus force said piston in its travel to the right. During the movement of the piston in the direction indicated, the water exhausts from the cylinder on the right of the piston through the valve J, which it will be observed, is unseated on the right side of the piston. The excess of pressure on the left side of the piston holds each valve to its seat until the piston reaches the limit of its stroke. When the piston approaches the limit of its movement to the right, the springs K on the right side of the piston will first make contact with the cylinder head and will compress and allow the valve stems to make contact with said cylinder head to unseat the inlet valve I on that side and to unseat the exhaust valve J on the opposite side of the piston, and vice versa during the operations of the motor.

I claim as my invention:

1. In a water motor, a cylinder, a piston divided into two non-communicating chambers, hollow rods communicating with said chambers, double-puppet inlet valves and double-puppet exhaust valves mounted in said piston, in combination with springs adapted to impart to said valves their final movements after being unseated, thereby reversing the travel of the piston.

2. In a water motor, a cylinder, having inclosing heads, a piston divided into two non-communicating chambers, hollow piston rods communicating with said chambers, balance exhaust valves lying on the outside of one of said chambers and seating against the outer sides of the piston, said exhaust valves being connected to a common stem and having extensions beyond the valves, balance inlet valves located within the other chamber, said inlet valves having stems projected on each side beyond the piston, coil springs carried upon the stems of said exhaust and inlet valves and adapted to impart the final movement to the valves after said valves have been given their initial movement by the contact of their stems with the cylinder heads, substantially as set forth.

In testimony whereof I affix my signature in the presence of two witnesses.

PETER T. COFFIELD.

Witnesses:
R. J. McCarty,
C. M. Theobald.